(12) United States Patent
Whitehouse

(10) Patent No.: US 8,793,224 B2
(45) Date of Patent: Jul. 29, 2014

(54) LINEAR SWEEP FILESYSTEM CHECKING

(75) Inventor: Steven John Whitehouse, Killay (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/483,551

(22) Filed: May 30, 2012

(65) Prior Publication Data

US 2013/0325817 A1 Dec. 5, 2013

(51) Int. Cl.
 *G06F 17/30* (2006.01)
(52) U.S. Cl.
 USPC .......................................................... 707/690
(58) Field of Classification Search
 USPC .......................................................... 707/690
 See application file for complete search history.

(56) References Cited

U.S. PATENT DOCUMENTS

| | | | |
|---|---|---|---|
| 7,464,125 B1 * | 12/2008 | Orszag et al. .......................... 1/1 |
| 7,899,795 B1 * | 3/2011 | Kahn et al. .................... 707/690 |
| 8,412,688 B1 * | 4/2013 | Armangau et al. ........... 707/695 |
| 2005/0114297 A1 * | 5/2005 | Edwards ........................... 707/1 |
| 2010/0049718 A1 * | 2/2010 | Aronovich et al. ............. 707/10 |
| 2013/0091101 A1 * | 4/2013 | Eslami Sarab et al. ....... 707/690 |

\* cited by examiner

*Primary Examiner* — Joshua Bullock
(74) *Attorney, Agent, or Firm* — Lowenstein Sandler LLP

(57) ABSTRACT

A filesystem checker identifies a metadata block in a filesystem and determines a number of pointers pointing to the metadata block and a number of pointers embedded in the metadata block. The filesystem checker records the number of pointers pointing to the metadata block and the number of pointers embedded in the metadata block in a filesystem checker array. The filesystem checker verifies a consistency of the filesystem using data recorded in the filesystem checker array.

21 Claims, 8 Drawing Sheets

LINEAR SWEEP FILESYSTEM CHECKING

TECHNICAL FIELD

This disclosure relates to the field of data storage and, in particular, to linear sweep filesystem checking.

BACKGROUND

A filesystem is a means to organize data on a storage device by providing procedures to store, retrieve and update the data, as well as manage the available space on the storage device or devices. A filesystem organizes data in an efficient manner and is tuned to the specific characteristics of the storage device. Filesystems are used on various types of data storage devices, such as hard disk drives, floppy disks, optical discs, or flash memory storage devices, to maintain the physical locations of computer files. Filesystems generally allocate space in a granular manner, usually using multiple physical units on the storage device. The file system is responsible for organizing files and directories, and keeping track of which areas of the device belong to certain files and which are not being used.

The filesystem contains data blocks storing the actual data from an application or operating system running on the computing device, as well as metadata blocks. The metadata contains information about the design, structure and layout of the data structures used to store the actual data. Traditionally, filesystem checkers are used to verify that the metadata contained therein is correct. Conventional filesystem checking has been done in a series of passes over the filesystem, each pass looking for a certain kind of error. Assuming that the filesystem is large enough that the state cannot all be stored in memory, it must be reread from the disk on each pass. In addition, not all passes read the data from the disk in a linear fashion, and sometimes, depending upon the layout of the blocks on disk, it can approach random input/output (I/O) if the filesystem checker has not been designed carefully. As filesystems grow in size, the time taken to check them also grows. For very large datasets, the time taken to check the filesystem can easily reach days or weeks.

BRIEF DESCRIPTION OF THE DRAWINGS

The present disclosure is illustrated by way of example, and not by way of limitation, in the figures of the accompanying drawings.

DETAILED DESCRIPTION

Figure 1:
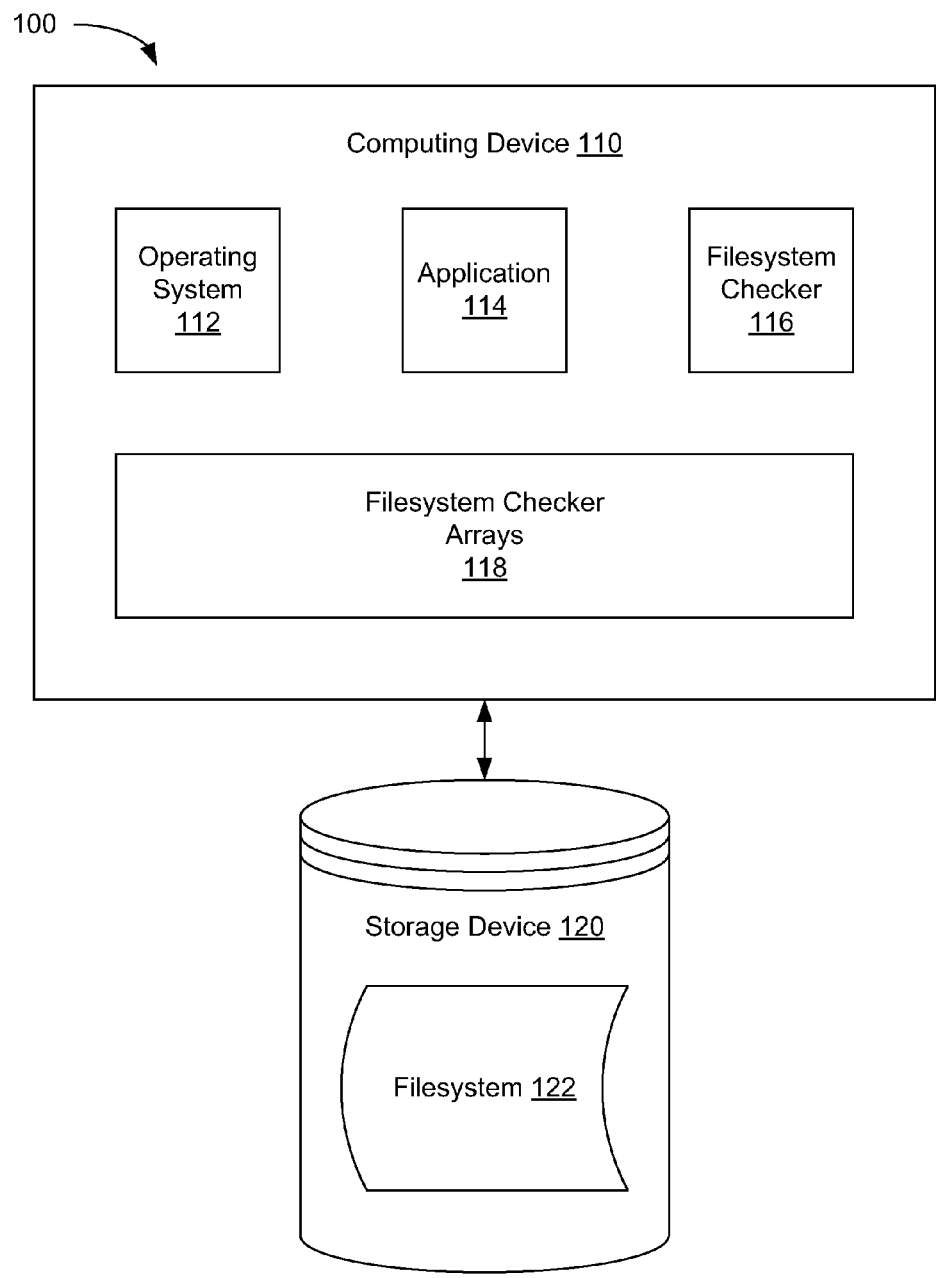
FIG. 1 is a block diagram illustrating a computing environment for deploying a linear sweep filesystem checker, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for linear sweep filesystem checking. In one embodiment, a filesystem checker identifies a metadata block in a filesystem and determines a number of pointers pointing to the metadata block and a number of pointers embedded in the metadata block. The filesystem checker may identify the metadata block by reading a value from a header of the block. The filesystem checker may record the number of pointers pointing to the metadata block and the number of pointers embedded in the metadata block in a filesystem checker array. The filesystem checker may verify a consistency of the filesystem using data recorded in the filesystem checker array.

In one embodiment, the filesystem checker applies a block number of the metadata block to a hash function associated with the filesystem checker array and identifies a counter associated with an entry in the filesystem checker array indexed by an output of the hash function. The filesystem checker may decrement the counter based on the number of pointers pointing to the metadata block. In addition, the filesystem checker may identify blocks in the filesystem to which the number of pointers embedded in the metadata block point. The filesystem checker may apply one or more block numbers of those identified blocks to the same hash function to identify one or more counters associated with one or more entries in the filesystem checker array. The filesystem checker may increment the one or more counters based on the number of pointers embedded in the metadata block.

In order to verify the consistency of the filesystem, the filesystem checker may compare a value of each counter in the filesystem checker array after the recording with an initial value of the counters. In a consistent filesystem, where each pointer has a proper origin and destination block, the value of each counter should match the initial value. If the value of each counter does not match the initial value, the filesystem checker may determine that there is an error in the filesystem. To determine a location of the error, the filesystem checker may reverse the hash function associated with the filesystem checker array to determine one or more metadata blocks associated with a counter that does not match the initial value.

The linear sweep filesystem checker described herein makes it possible to verify the consistency of a filesystem with a single linear scan of the contents. This can lead to significantly faster checking than methods that require multiple passes over the filesystem. In addition, the filesystem checker uses a fixed amount of memory that is well within the scope of most modern computing devices. The result of the checking may be a yes/no answer to the question of whether the filesystem is correct, and has a very high probability of being accurate.

FIG. 1 is a block diagram illustrating a computing environment for deploying a linear sweep filesystem checker, according to an embodiment of the present invention. In one embodiment, computing environment 100 includes computing device 110 and storage device 120. Computing device 110, may be for example, a desktop, laptop, notebook, netbook, tablet, smartphone, server or other computing device.

Computing device 110, may include for example, the computer system 800 described below with respect to FIG. 8. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, computing device 110 includes operating system 112, one or more computer application programs 114, filesystem checker 116 and filesystem checker arrays 118. Operating system (OS) 112 may include software, consisting of programs and data, that runs on computing device 110. The OS 112 manages computer hardware and provides common services for efficient execution of various computer application software programs, such as computer application program 114. Computer application program 114 may perform one or more computer implemented functions. Computer application program 114 may implement the functionality of a word processing program, spreadsheet program, email program, chat program, web browser or other program. In one embodiment, computer application program 114 may be part of OS 112 running on computing device 110, or may run on top of the OS 112. Embodiments of the linear sweep filesystem checking described herein may work with any computer application program running on computing device 110.

Storage device 120 may store one or more filesystems 122. Filesystem 122 may organize data on storage device 120 by providing procedures to store, retrieve and update the data, as well as manage the available space on the storage device 120. Filesystem 122 may allocate storage space in a granular manner, for example using blocks of storage. Filesystem 122 may be responsible for organizing files and directories, and keeping track of which areas of storage device 120 belong to certain files and which are not being used. The data in filesystem 122 may be provided by operating system 112 and/or computer application program 114. In addition, filesystem 122 may include metadata blocks containing information about the design, structure and layout of the data structures used to store the actual application data in filesystem 122. Examples of filesystem 122 may include Global Filesystem 2 (GFS2), Extended Filesystem Two, Three or Four (ext2/3/4), or some other type of filesystem.

One common arrangement for filesystem 122 may include dividing the storage device 120 into sections (e.g., in ext2/3/4 these sections are called block groups and in GFS2 they are called resource groups), each of which has a bitmap (or in some filesystems, extent maps) which keep track of which parts of the respective section is in use and which parts are free. In addition, filesystem 122 may have a common header which is applied to metadata blocks so that the type of block may be identified directly from the block contents.

Filesystem checker 116 is a tool for checking the consistency of filesystem 122. One common task during filesystem checking is to verify that pointers which exist between the various data structures in filesystem 122 form a correct graph, such that the pointers allow for traversal of the filesystem without causing any errors. A pointer may include a programming language data type whose value refers directly to (or "points" to) another value stored elsewhere in filesystem using the address of the other value. The most common graphs used in filesystems are tree structures. In GFS2 for example, a super block contains pointers to the root and master inodes. An inode (index-node) may be a data structure that stores information about files and directories (folders), such as file ownership, access mode (read, write, execute permissions), and file type. These in turn contain pointers to other blocks, and from those pointers, the whole filesystem can be discovered by following the tree to its conclusion. Filesystem checker 116 may verify that this tree structure is correct in that it is fully connected, and that the correct block types are pointed to by each pointer, and in addition, that there are no loops.

Filesystem checker 116 may implement an algorithm, making use of filesystem checker arrays 118, by which it is possible to check filesystem 122 with a single linear scan of the contents. The algorithm may use a fixed amount of memory that is well within the scope of computing device 110. The result of the algorithm may be a yes/no answer to the question of whether the filesystem graph is correct. This result will have a very high probability of being correct. In addition, the result may provide an approximate location for any errors discovered in the filesystem 122, provided that the error rate is relatively low with respect to the filesystem size. Additional details regarding filesystem checker 116 and filesystem checker arrays 118 will be provided below.

Figure 2:
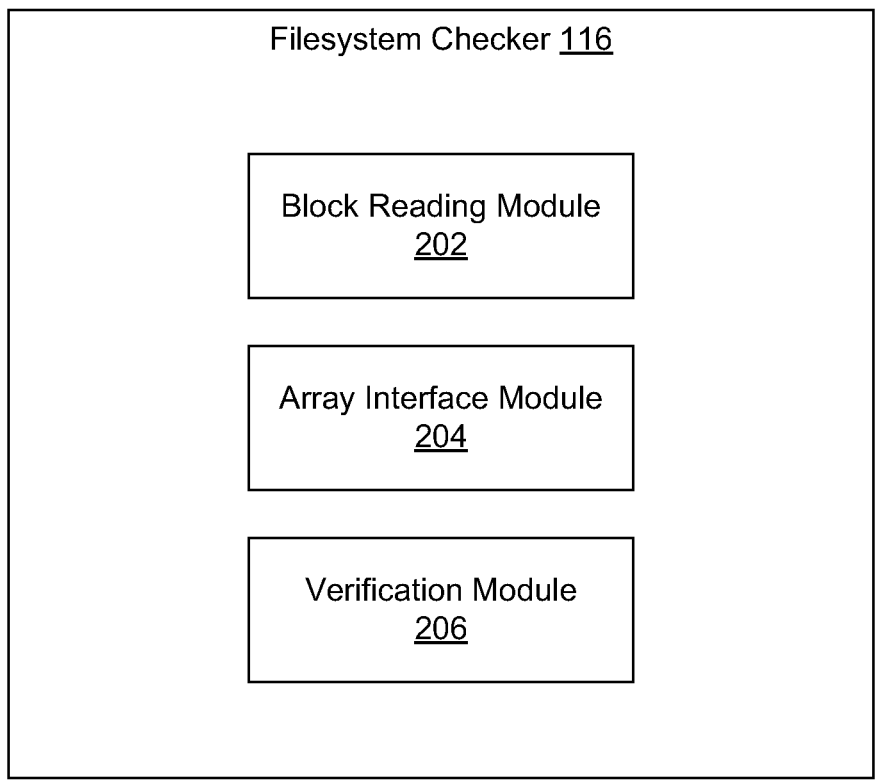
FIG. 2 is a block diagram illustrating a linear sweep filesystem checker, according to an embodiment.

FIG. 2 is a block diagram illustrating a linear sweep file system checker 116, according to an embodiment of the present invention. In one embodiment, file system checker 116 may include block reading module 202, array interface module 204 and verification module 206.

Block reading module 202 may be responsible for linearly (or sequentially) reading the blocks or other sections of filesystem 122 on storage device 120. Block reading module 202 may examine the header (or bitmap) of each section to determine if the block contains data (e.g., from OS 112 or application 114) or metadata describing the structure or format of the filesystem 122. Upon identifying a metadata block, block reading module 202 may read the contents of the block to determine how may pointers are pointing to that metadata block and how many pointers are embedded within the block, pointing to other blocks. Block reading module 202 may store this information, for example, in memory of computing device 110.

Block reading module 202 may be designed to read the blocks of filesystem 122 sequentially with maximum efficiency. For example if there are two metadata blocks which are separated by an unallocated (and therefore, uninteresting) block, block reading module 202 may read all three blocks and discard the data from the unallocated block in order to avoid creating an extra disk seek and an extra I/O request. If storage device 120 is a rotational device, such as a disk drive, then reducing seeks can help improve efficiency. If storage device 120 is, for example, a solid state drive (SSD) or a disk array with a large cache, then reducing the number of I/O requests can improve efficiency. In one embodiment, block reading module 202 feeds, in linear disk block number order, a series of pairs of block number and block content, of metadata blocks to a recording process.

Array interface module 204 may be responsible for recording the information obtained by block reading module in filesystem checker arrays 118. The filesystem checker arrays may include a number of arrays, each indexed by a hash based on a block number of an incoming block and a hash function specific to that array. The array entries may be counters, which are initialized to an initial value (e.g., zero) at the start of the filesystem check. The range of the counters should be large enough to allow for the maximum possible counts to be recorded (both positive and negative). The greater the number of array entries, the smaller the counters need to be, since fewer disk blocks will map to any one particular hash bucket based on the hash function of the array. Array interface module 204 may apply the block number of a block from filesystem 122 to the hash function of a first array in filesystem checker arrays 118 to determine an index of one of the counters in the array. Based on the number of pointers that should be pointing to that metadata block and the blocks that pointers embedded within the block are pointing to, array interface module 204 may increment or decrement the counter appropriately, as will be described in detail below. Array interface module may repeat this process for the same block with each array in filesystem checker array 118 and then again for each block in filesystem 122.

Verification module 206 may be responsible for verifying that filesystem 122 is correct based on the information recorded by array interface module 204. After all data for all the blocks has been recorded by array interface module 204, verification module 206 may compare the value of each counter in each array to the initial value of that counter. If the filesystem does not contain any errors, each counter should match its initial value. If there are any counters that do not match the initial value, verification module 206 may reverse the hash function for that array to identify blocks that are associated with that entry. Verification module 206 may store the block numbers of those blocks as a set of possible error locations in filesystem 122. Verification module 206 may repeat this process for each counter in each array. The intersection of the sets of blocks numbers should represent possible locations of an error in the files system 122. Verification module 206 may automatically examine those blocks for errors.

Figure 3:
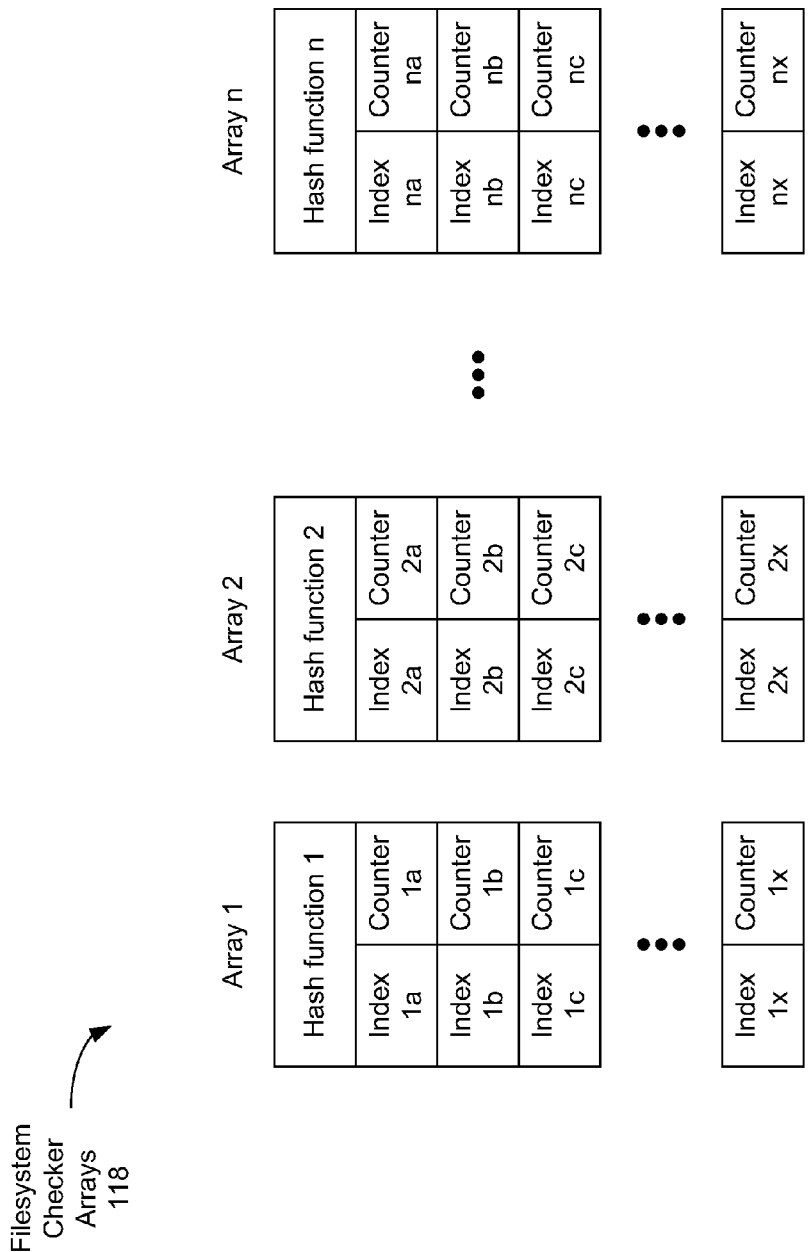
FIG. 3 is a block diagram illustrating filesystem checker arrays, according to an embodiment.

FIG. 3 is a block diagram illustrating filesystem checker arrays 118, according to an embodiment of the present invention. In one embodiment, the filesystem checker arrays 118 may include a number of arrays, such as Array 1, Array 2, up to Array n. An array is a data structure including a collection of entries, each identified by at least one array index or key. An array is stored so that the position of each entry in memory can be computed from its index by a mathematical formula. In one embodiment, each array has an individual hash function which can be used to determine an index of one of the entries in the array. Each entry may have an index (e.g., Index 1a) and a counter (e.g., Counter 1a). The counter may be set to an initial value of zero, however, in other embodiments, some other initial value may be used. In other embodiments, some other data structure may be used besides an array.

A suitable hash function may provide an even distribution of hashed block numbers into buckets, allows for easy reverse mapping of buckets to possible block numbers, and map the same block to different buckets than the hashes of the other arrays. A simple hash function which obeys these properties can be created using the concatenation of two simple stages: selection and permutation.

Assuming, for example, that block numbers are 64 bit unsigned numbers, the hash will be a 20 bit unsigned number, and there will be a set of 16 hash functions, the selection stage beings with selecting 20 of the 64 bits from the block number. This selection may be pre-selected for a particular hash function, and thus slightly less than one in three of the bits in the original block number will be used in this example. Within a set of hash functions, a different selection of bits may be used for each one. The selection process is complete in the sense that every bit of the 64 bit block number is represented somewhere within one of the hash functions in the set. For the example of 16 hash functions, the hash functions may be designed such that each bit appears in approximately four of the hash functions, since it is already noted that it will take slightly more than three hash functions to provide a complete coverage of all of the bits of the 64 bit block number. One possible design solution would be to pick 20 bit positions randomly from the 64 bit number for each of the hash functions and then if they didn't meet the criteria above for completeness, reject some or all of the generated selections and try again. It would also be possible to select the bits by hand too, to meet the same criteria.

The permutation stage may include taking the 20 bits from the first stage, and permuting them according to a preselected permutation. This permutation can be generated simply by selecting a random permutation out of all the possible permutations of 20 bits. Again, a different permutation may be used for each hash function in the set. A permutation used in this way is that it is easily reversible. Any other bijective mapping could be used at this point in the process, such as an exclusive-OR of pairs of preselected bits. The intent of the permutation step is to ensure that when fed with sequential integers, the overall hash function results in an even as possible assignment to hash buckets.

In one embodiment, array interface module 204 applies the block number of a metadata block from filesystem 122 to the hash function (e.g., hash function 1) of the first array Array 1. The output of hash function 1 will be an index (e.g., Index 1c) of an entry in Array 1. That entry may also include a counter (e.g., Counter 1c). In one embodiment, if the current metadata block should have a pointer pointing to it, array interface module 204 may decrement Counter 1c by a set value. In one embodiment, the set value may be one, however in other embodiments, some other set value may be used. In general, metadata blocks will usually only have a single pointer pointing to them in a correct filesystem, however, inodes may have multiple pointers pointing to them. The number of pointers that should be pointing to an inode may be determined from the link count value in the header of the inode block. Furthermore, if the current metadata block has one or more pointers embedded within it pointing to other blocks in files system 122, array interface module 204 may increment a counter corresponding to the hash of the block number of the block that the embedded pointer is point to by the set value. If the metadata block includes multiple pointers embedded within it, array interface module 204 may increment each of the corresponding counters by the set value. In other embodiments, the incrementing and decrementing may be reversed, such that the counter is incremented for pointers pointing to the block and decremented for pointers from the block. Therefore, since the counter is incremented or decremented for every pointer that should be pointing to a block, and decremented or incremented for every pointer that actually points to a block, the end result should be that each counter returns to the initial value if there are no errors in the filesystem. An error may occur, for example, if a pointer points to a data block, rather than a metadata block, to an unallocated block or if multiple pointers point to a single metadata block.

Array interface module 204 may repeat this process for the same block with each array in filesystem checker array 118 (e.g., Array 2 through Array n). Each array may have a different hash function (e.g., hash function 2, hash function n) so that different block numbers will hash to entries having different indexes. In one embodiment, each array of filesystem checker arrays 118 may have the same number of entries (e.g., 1 million), however in other embodiments, the arrays may have varying numbers of entries. In one embodiment, for example, there may be sixteen arrays in file system checker arrays 118, however in other embodiments, there may be some other number of arrays. A minimum of one array is all that is needed, however, as the number of arrays increases, the accuracy of the filesystem checking will also increase. Array interface module 204 may repeat the above process again for each block in filesystem 122.

Figure 4:
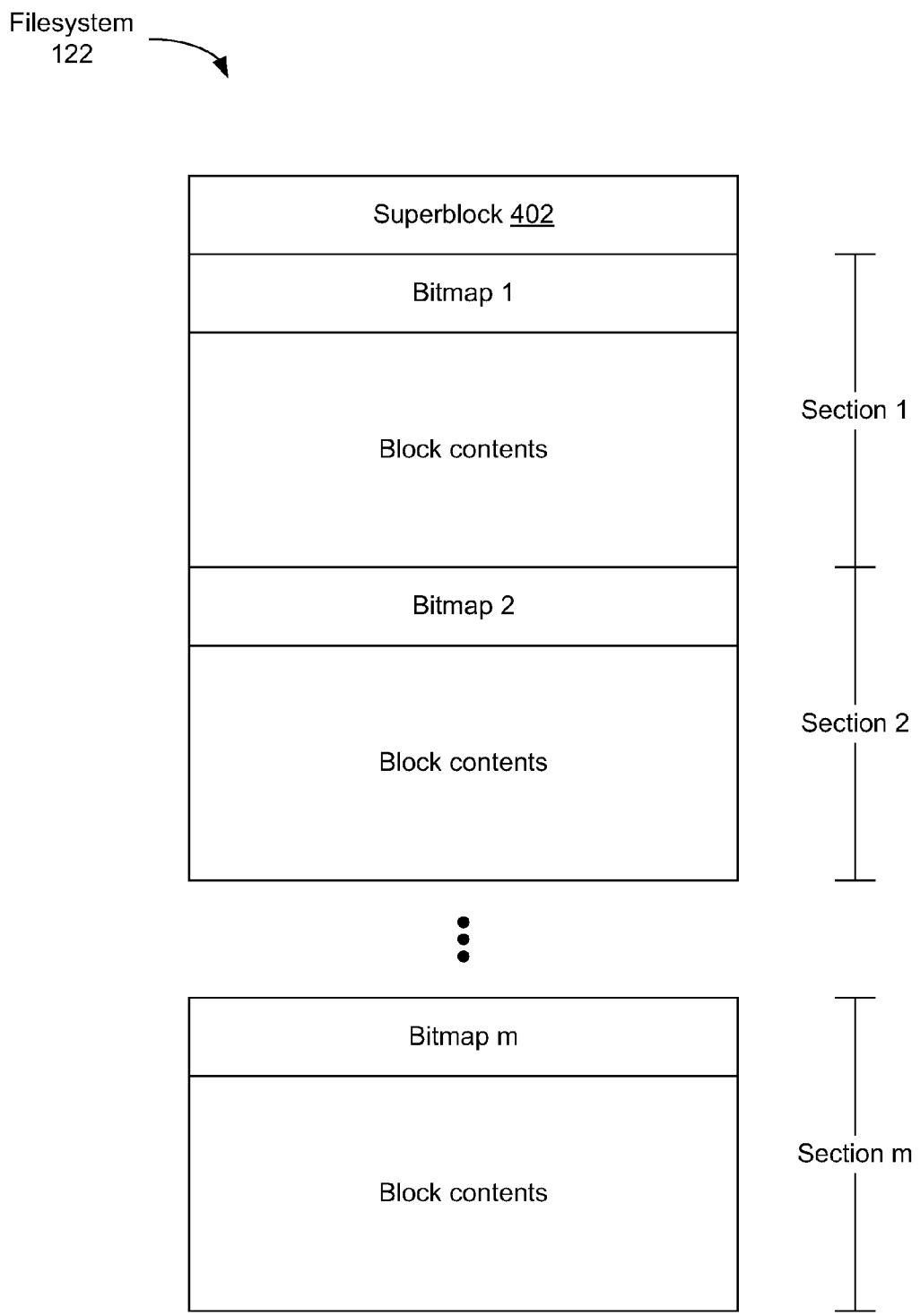
FIG. 4 is a block diagram illustrating the layout of filesystem, according to an embodiment.

FIG. 4 is a block diagram illustrating the layout of filesystem 122, according to an embodiment. The layout represents the physical organization of filesystem 122 on storage device 122. In one embodiment, filesystem 122 begins with a super block 402. The super block 402 may contain pointers to root and master inodes (not shown). These in turn may contain pointers to other blocks (e.g., metadata blocks and inodes), and from those pointers, the whole filesystem can be discovered by following the resulting tree to its conclusion. The remaining portion of the filesystem 122 may be physically or logically divided into different sections (e.g., Section 1, Section 2, Section m). The sections may be, for example, resource groups, block groups ("blocks"), allocation groups, etc. Each section in the filesystem 122 may include a header of bitmap (e.g., Bitmap 1, Bitmap 2, Bitmap m). The bitmap may include a section or block number, which uniquely identifies the section, and may also contain a value to identify the section as actual data or metadata, so that filesystem checker 116 can identify interesting sections (i.e., metadata sections). If the section is, for example, an inode, the section may include a link count value, which indicates how many pointers in other blocks point (or "link") to the inode. In addition to the bitmap, each section may also include a block contents. As discussed above, if a section is identified as metadata, block reading module 202 may read the block contents to determine which blocks the pointers embedded within the section point to. For example, the block contents of Section 1 may include a pointer that points to Section 2 (e.g., by identifying the block number of Section 2).

Figure 5:
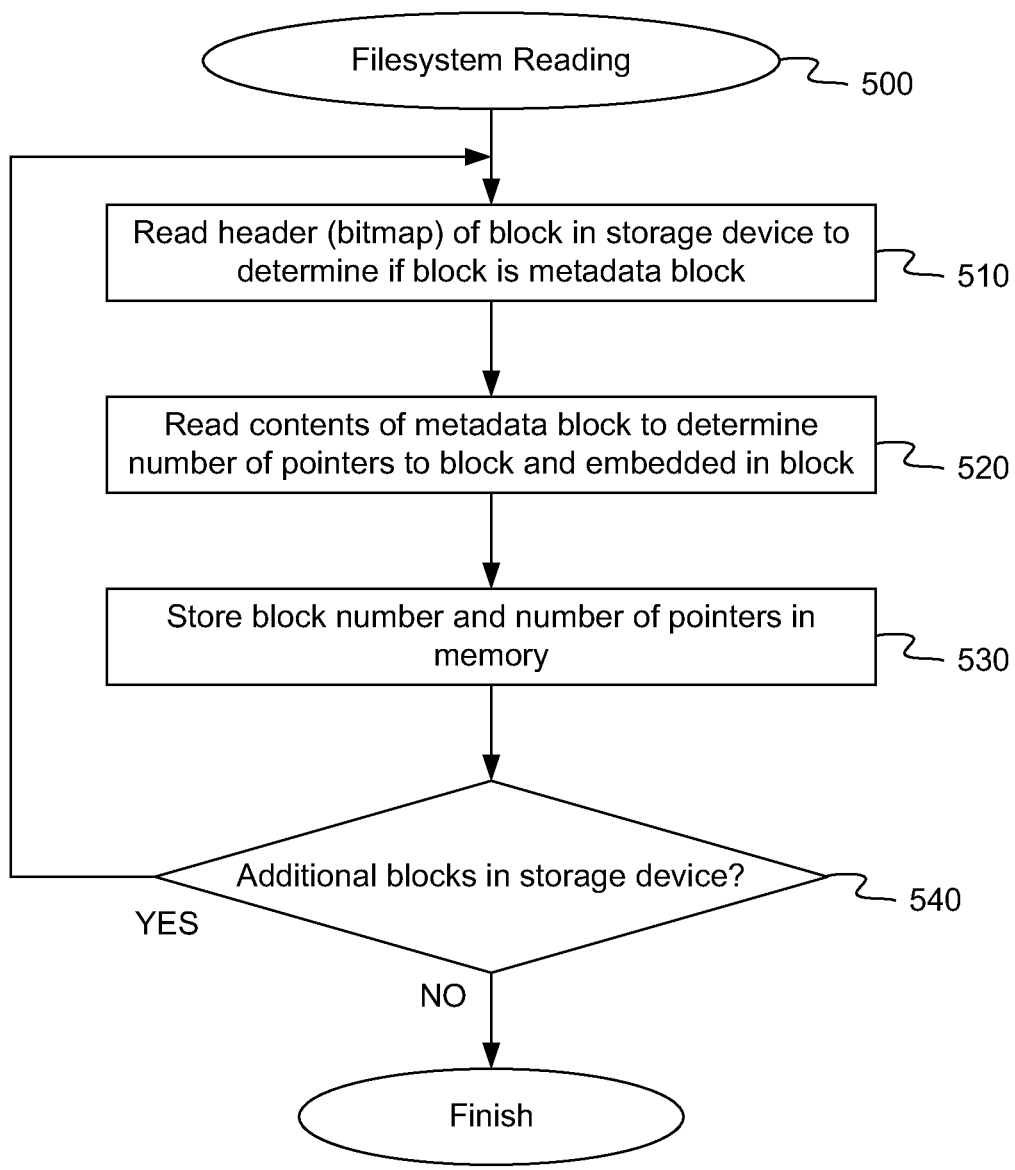
FIG. 5 is a flow diagram illustrating a filesystem reading method, according to an embodiment.

FIG. 5 is a flow diagram illustrating a filesystem reading method, according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to sequentially read the blocks or sections of a filesystem and identify blocks that contain metadata. In one embodiment, method 500 may be performed by filesystem checker 116, as shown in FIGS. 1 and 2.

Referring to FIG. 5, at block 510, method 500 reads the header (or bitmap) of a first section or block of the filesystem 122 on storage device 120. Block reading module 202 of filesystem checker 116 may examine the header (e.g., Bitmap 1) to determine if the block (e.g., Section 1) is a metadata block. In one embodiment, each block that contains metadata may have a 2 bit value in the header which is set to a predetermined value indicating the presence of metadata.

At block 520, method 500 reads the contents of the metadata block to determine which blocks are pointed to by pointers embedded in the contents of the block. In one embodiment, the metadata block may include one or more pointers pointing to other sections of the filesystem 122, for example, based on the block number. Upon identifying a metadata block, block reading module 202 may read the contents of the block to determine how many pointers are embedded within the block, pointing to other blocks, and identify the block numbers of those blocks. For example, the block contents of Section 1 of filesystem 122 may include a pointer to Section 2, identifying Section 2 by the block number or other identifier of Section 2. At block 530, method 500 may store this information, for example, in memory of computing device 110.

At block 540, method 500 determines if there are additional sections in filesystem 122. Block reading module 202 may proceed sequentially through filesystem 122, repeating the steps at blocks 510-530 for each block, until the end of the filesystem 122 is reached.

Figure 6:
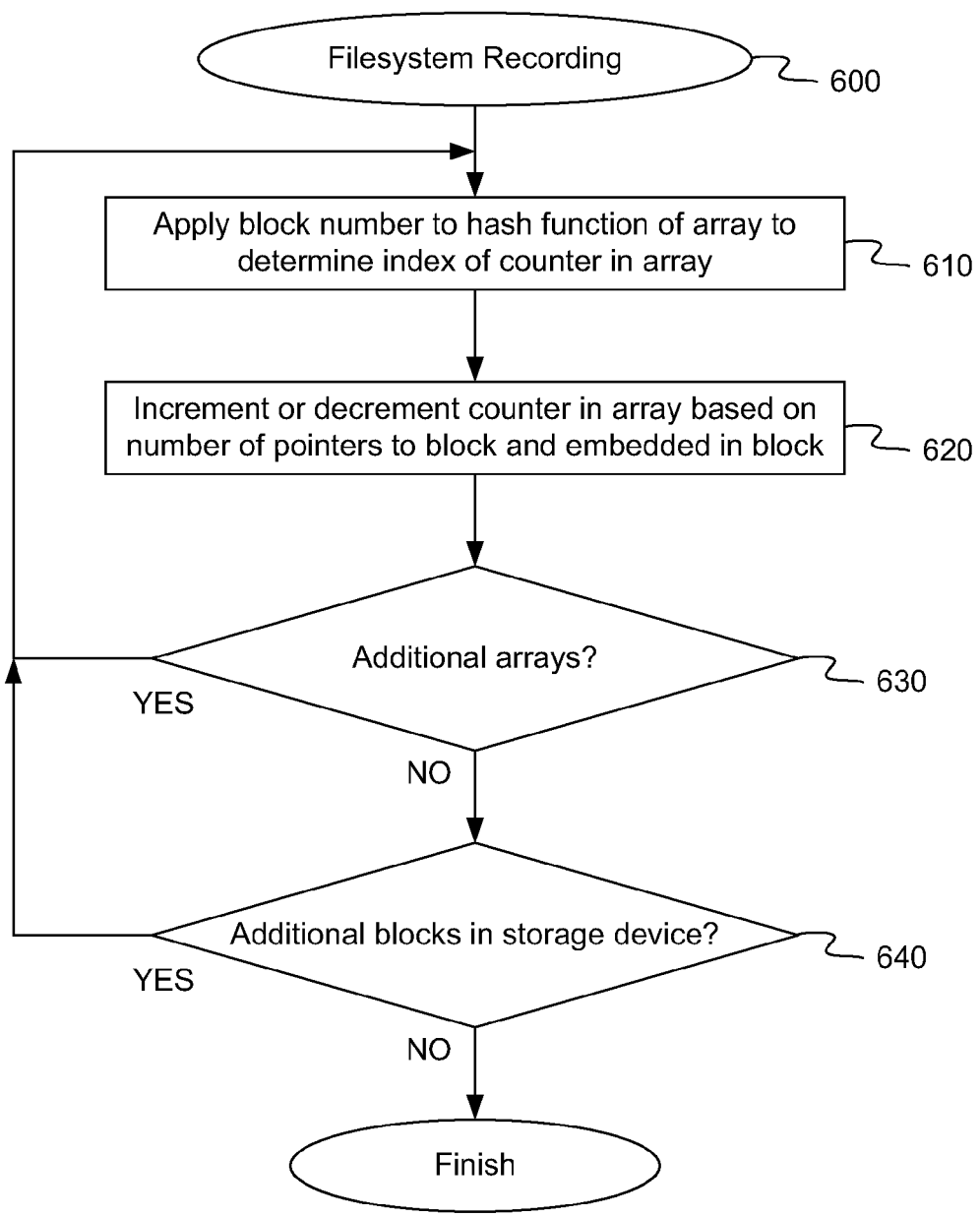
FIG. 6 is a flow diagram illustrating a filesystem recording method, according to an embodiment.

FIG. 6 is a flow diagram illustrating a filesystem recording method, according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to record the data read from metadata blocks of filesystem 122 in filesystem checker arrays 118. In one embodiment, method 600 may be performed by filesystem checker 116, as shown in FIGS. 1 and 2.

Referring to FIG. 6, at block 610, method 600 applies the block number of a metadata block of the filesystem 122 to a hash function of a first array (e.g., Array 1) in filesystem checker arrays 118. The block number may be the block number of a metadata block identified by block reading module 202, or it may be the block number of a block or section that is pointed to by a pointer embedded within the contents of the metadata block. In one embodiment, for example, array interface module 204 may apply the block number of Section 1 to hash function 1. The result of the hash function may be an index of one of the entries in Array 1. For the purposes of this example, the determined index may be index $1b$, which is associated with counter $1b$.

At block 620, method 600 increments and/or decrements the counter associated with the determined index. The counter (e.g., counter $1b$) may be initialized to an initial value (e.g., zero) at the start of the filesystem check. For example a metadata block should normally have one pointer pointing to it. Thus, in one embodiment, array interface module 204 may decrement counter $1b$ by a set value (e.g., one). The block number of the block to which one of the pointers embedded in the metadata block pointed may hash to a different index (e.g., index $1c$). Thus, array interface module 204 may increment counter $1c$ by the same set value.

At block 630, method 600 determines if there are additional arrays in filesystem checker arrays 118. If there are additional arrays, array interface module 204 may apply the block number or numbers to the hash function of a subsequent array. The hash function of the next array (e.g., Array 2) may be different, such that the block number will hash to a different index value. Method 600 may repeat the steps of blocks 610 and 620 for each of the remaining arrays in filesystem checker arrays 118.

At block 640, method 600 determines if there are additional blocks or sections in filesystem 122. If there are additional blocks, array interface module 204 may repeat the steps of blocks 610-630 for each of the additional blocks.

Figure 7:
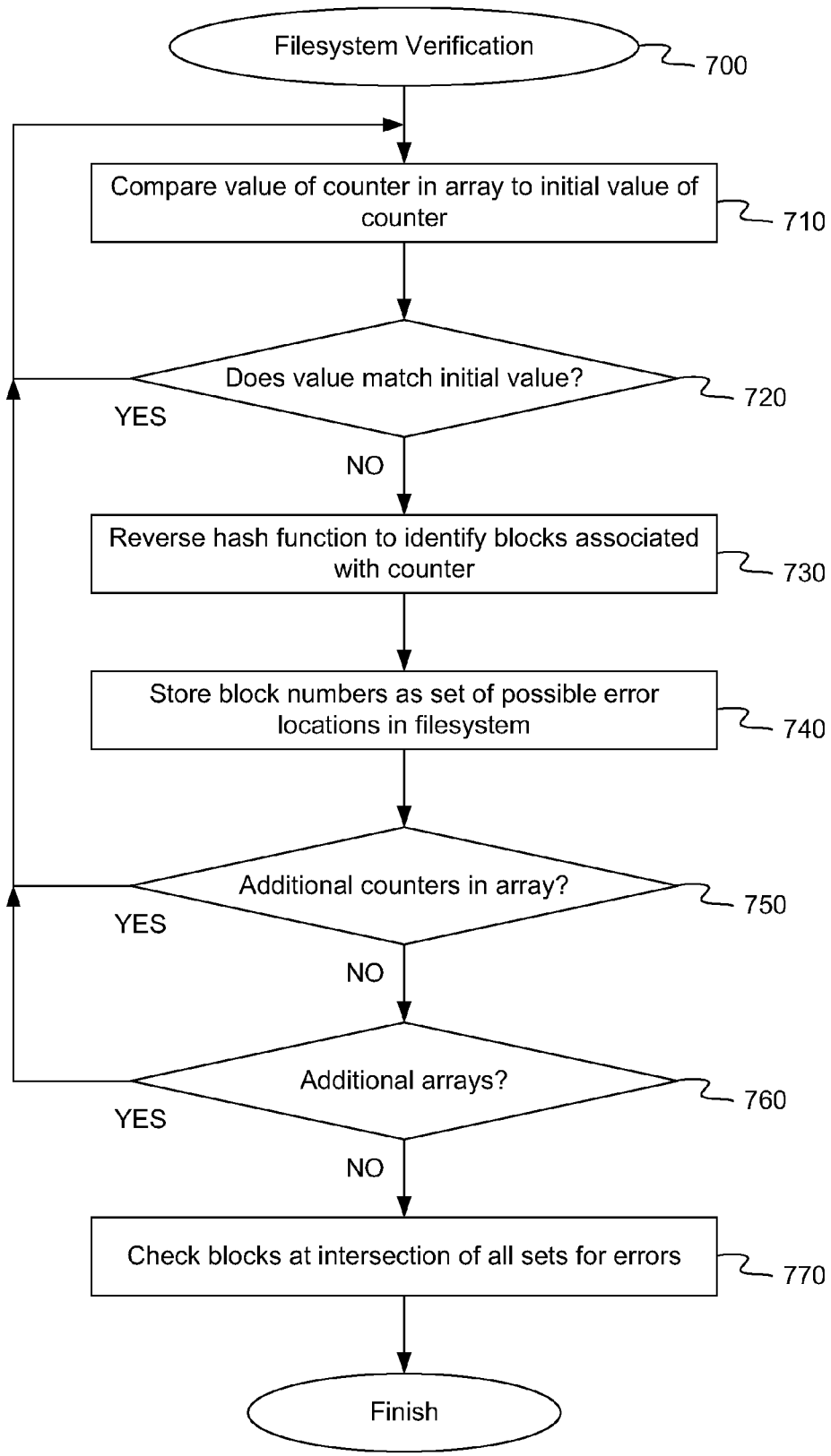
FIG. 7 is a flow diagram illustrating a filesystem verification method, according to an embodiment.

FIG. 7 is a flow diagram illustrating a filesystem verification method, according to an embodiment. The method 700 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to detect errors in the metadata blocks of filesystem 122. In one embodiment, method 700 may be performed by filesystem checker 116, as shown in FIGS. 1 and 2.

Referring to FIG. 7, at block 710, method 700 compares the value in a first counter (e.g., counter $1a$) of the first array (e.g., Array 1) after the filesystem recording method 600 has been performed to the initial value of the counter. In one embodiment, verification module 206 reads the current value of the counter and performs the comparison to the known initial value, which may be stored, for example, in memory. At block 720, method 700 determines if the current value of the counter matches the initial value. If the values match, method 700 returns to block 710 and compares the values of a subsequent counter. If the values do not match, method 700 proceeds to block 730.

At block 730, method 700 reverses the hash function of the array (e.g., hash function 1) to identify one or more blocks associated with the counter and entry of the array. At block 740, method 700 stores the block numbers of the blocks identified at block 730 as a set of possible error locations in filesystem 122. In one embodiment, verification module 206 may store those block numbers in memory on computing device 110.

Unlike in the cryptographic case, hash functions for this particular algorithm should be easily reversible. If, for example that there is exactly one error in the tree structure of filesystem 122, this will result in a single counter being non-zero in each of the filesystem checker arrays 118. With knowledge of the reverse hash function (and the limitations presented by actual size of the filesystem), it is possible to compute the possible locations of the error. It is likely that there will be very few candidate blocks which meet the criteria imposed by the counters. The sign of the counter will show whether the problem is a pointer to a non-existent metadata block, or a metadata block which has no pointer to it. In the case of a metadata block with no pointer, the error will show up under the hash of the block itself, making that block relatively easy to locate. In the case of a pointer to a non-existent block, the counter will reveal the location of the block that is pointed to, so that a second search may be required in order to figure out which block contains the erroneous pointer. This may be done in a variety of ways. In one embodiment, a second linear search of the filesystem may be required in order to locate the block containing the pointer to the non-existent block, however, it is usually possible to locate the block more quickly. It is likely that the block containing the erroneous pointer will be located near by (and most likely) in the same resource group as the erroneous pointer. If the erroneous pointer points outside the filesystem, then this is a separate class of error which can be detected during the initial scan. As the number of detected errors increases, the number of potential locations to be searched after the initial linear scan increases also. At some point, depending upon the number of array/hash pairs and the size of the arrays, and the ease of inversion of the hash function, there will be so many potential locations that testing them all will become a major expense in terms of I/O required. At this point, it would make sense for a practical implementation to fall back to a previous fsck (filesystem check) algorithm.

At block 750, method 700 determines if there are additional counters in the current array. If so, method 700 repeats the steps of blocks 710-740 for each counter in the current array. At block 760, method 700 determines if there are additional arrays in filesystem checker arrays 118. If so, method 700 repeats the steps of blocks 710-750 for each of the additional arrays.

Once all of the counters in each array have been checked for mismatches between the current values and the initial values, at block 770, method 700 determines an intersection of the stored sets of block numbers. Verification module 206 may compare the stored sets of block numbers and identify one or more blocks numbers that are common to each set. These block numbers should represent the blocks or sections of filesystem 122 that contain an error. Verification module 206 may report these errors to another program or to a user, so that the identified sections can be checked and the error remedied.

Figure 8:
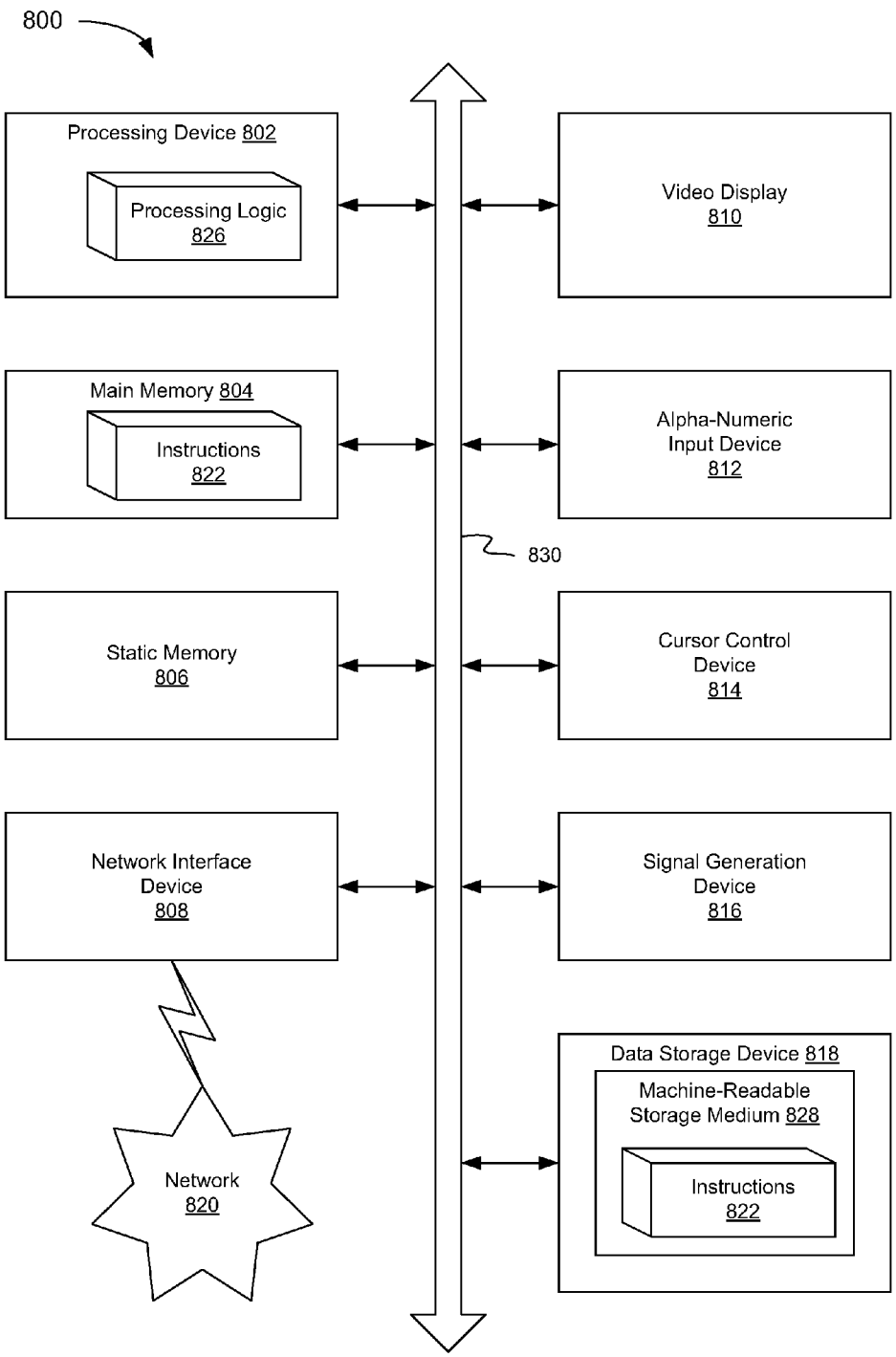
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of server 108 and/or end user systems 130.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions to perform a method for dynamic replacement of security credentials for secure proxying as described above, and/or a software library containing methods that call the above applications. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    identifying a metadata block in a filesystem;
    determining a number of pointers in the filesystem pointing to the metadata block and a number of pointers embedded in the metadata block;
    recording, by a processing device, data comprising the number of pointers pointing to the metadata block and the number of pointers embedded in the metadata block in a filesystem checker array, wherein the filesystem checker array is separate from the metadata block, and wherein the recording comprises decrementing a first counter based on the number of pointers pointing to the metadata block and incrementing one or more second counters based on the number of pointers embedded in the metadata block; and
    verifying a consistency of the filesystem using the data recorded in the filesystem checker array.

2. The method of claim 1, wherein identifying the metadata block comprises reading a value from a header of the metadata block.

3. The method of claim 1, wherein the recording comprises:
    applying a block number of the metadata block to a hash function associated with the filesystem checker array; and
    identifying the first counter associated with an entry in the filesystem checker array indexed by an output of the hash function.

4. The method of claim 3, further comprising:
    identifying blocks in the filesystem to which the number of pointers embedded in the metadata block point.

5. The method of claim 4, wherein the recording further comprises:
    applying one or more block numbers of the blocks in the filesystem to which the number of pointers embedded in the metadata block point to the hash function associated with the filesystem checker array; and
    identifying the one or more second counters associated with one or more entries in the filesystem checker array indexed by one or more outputs of the hash function.

6. The method of claim 5, wherein the verifying comprises:
    comparing a value of each of the first counter and the one or more second counters in the filesystem checker array with an initial value; and
    if the value of each counter does not match the initial value, determining that there is an error in the filesystem.

7. The method of claim 6, wherein the verifying further comprises:
    reversing the hash function associated with the filesystem checker array to determine one or more metadata blocks associated with a counter that does not match the initial value.

8. A system comprising:
    a processing device;
    a memory coupled to the processing device; and
    a filesystem checker, executable by the processing device from the memory, to:
        identify a metadata block in a filesystem;
        determine a number of pointers in the filesystem pointing to the metadata block and a number of pointers embedded in the metadata block;
        record data comprising the number of pointers pointing to the metadata block and the number of pointers embedded in the metadata block in a filesystem checker array, wherein the filesystem checker array is separate from the metadata block, and wherein the recording comprises decrementing a first counter based on the number of pointers pointing to the metadata block and incrementing one or more second counters based on the number of pointers embedded in the metadata block; and
        verify a consistency of the filesystem using the data recorded in the filesystem checker array.

9. The system of claim 8, wherein identifying the metadata block comprises reading a value from a header of the metadata block.

10. The system of claim 8, wherein the filesystem checker is further to:
    apply a block number of the metadata block to a hash function associated with the filesystem checker array; and
    identify the first counter associated with an entry in the filesystem checker array indexed by an output of the hash function.

11. The method of claim 10, wherein the filesystem checker is further to:
    identify blocks in the filesystem to which the number of pointers embedded in the metadata block point.

12. The method of claim 11, wherein the filesystem checker is further to:
    apply one or more block numbers of the blocks in the filesystem to which the number of pointers embedded in the metadata block point to the hash function associated with the filesystem checker array; and
    identify the one or more second counters associated with one or more entries in the filesystem checker array indexed by one or more outputs of the hash function.

13. The method of claim 12, wherein the filesystem checker is further to:
compare a value of each of the first counter and the one or more second counters in the filesystem checker array with an initial value; and
if the value of each counter does not match the initial value, determine that there is an error in the filesystem.

14. The method of claim 13, wherein the filesystem checker is further to:
reverse the hash function associated with the filesystem checker array to determine one or more metadata blocks associated with a counter that does not match the initial value.

15. A non-transitory machine-readable storage medium storing instructions which, when executed, cause a processing device to perform operations comprising:
identifying a metadata block in a filesystem;
determining a number of pointers in the filesystem pointing to the metadata block and a number of pointers embedded in the metadata block;
recording, by the processing device, data comprising the number of pointers pointing to the metadata block and the number of pointers embedded in the metadata block in a filesystem checker array, wherein the filesystem checker array is separate from the metadata block, and wherein the recording comprises decrementing a first counter based on the number of pointers pointing to the metadata block and incrementing one or more second counters based on the number of pointers embedded in the metadata block; and
verifying a consistency of the filesystem using the data recorded in the filesystem checker array.

16. The non-transitory machine-readable storage medium of claim 15, wherein identifying the metadata block comprises reading a value from a header of the metadata block.

17. The non-transitory machine-readable storage medium of claim 15, wherein the recording comprises:
applying a block number of the metadata block to a hash function associated with the filesystem checker array; and
identifying the first counter associated with an entry in the filesystem checker array indexed by an output of the hash function.

18. The non-transitory machine-readable storage medium of claim 17, wherein the method operations further comprise:
identifying blocks in the filesystem to which the number of pointers embedded in the metadata block point.

19. The non-transitory machine-readable storage medium of claim 18, wherein the recording further comprises:
applying one or more block numbers of the blocks in the filesystem to which the number of pointers embedded in the metadata block point to the hash function associated with the filesystem checker array;
identifying the one or more second counters associated with one or more entries in the filesystem checker array indexed by one or more outputs of the hash function.

20. The non-transitory machine-readable storage medium of claim 19, wherein the verifying comprises:
comparing a value of each of the first counter and the one or more second counters in the filesystem checker array with an initial value; and
if the value of each counter does not match the initial value, determining that there is an error in the filesystem.

21. The non-transitory machine-readable storage medium of claim 20, wherein the verifying further comprises:
reversing the hash function associated with the filesystem checker array to determine one or more metadata blocks associated with a counter that does not match the initial value.

* * * * *